(12) United States Patent
Lee et al.

(10) Patent No.: US 10,356,569 B2
(45) Date of Patent: Jul. 16, 2019

(54) SYSTEM AND METHOD FOR EFFICIENT SHORT MESSAGE SERVICE DELIVERY USING PRIVATE SUBSCRIBER IDENTITY INFORMATION

(71) Applicant: Verizon Patent and Licensing Inc., Arlington, VA (US)

(72) Inventors: Kwai Yeung Lee, Pittsburg, CA (US); Wing-Cheong V. Yeung, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/145,849

(22) Filed: Sep. 28, 2018

(65) Prior Publication Data
US 2019/0082308 A1    Mar. 14, 2019

Related U.S. Application Data

(63) Continuation of application No. 15/702,330, filed on Sep. 12, 2017, now Pat. No. 10,117,072.

(51) Int. Cl.
*H04W 4/14* (2009.01)
*H04L 12/58* (2006.01)
*H04L 29/12* (2006.01)
*H04W 4/06* (2009.01)

(52) U.S. Cl.
CPC ............... *H04W 4/14* (2013.01); *H04L 51/06* (2013.01); *H04L 51/38* (2013.01); *H04L 61/1588* (2013.01); *H04W 4/06* (2013.01)

(58) Field of Classification Search
CPC .......... H04W 60/04; H04W 8/24; H04W 4/14
See application file for complete search history.

(56) References Cited

U.S. PATENT DOCUMENTS

| 2012/0099524 | A1 | 4/2012 | Cai | |
|---|---|---|---|---|
| 2012/0202550 | A1* | 9/2012 | Marisico | H04W 48/18 |
| 2014/0179296 | A1* | 6/2014 | Cai | H04W 8/24 |
| 2016/0295544 | A1* | 10/2016 | Jiang | H04W 60/04 |
| 2017/0201605 | A1* | 7/2017 | Le Rouzic | H04L 29/06 |

* cited by examiner

*Primary Examiner* — Myron Wyche (57) ABSTRACT

A device may receive, from a subscriber identity module (SIM) over-the-air (OTA) (SIM OTA) device, a short message peer-to-peer (SMPP) message. The SMPP message including an international mobile subscriber identity (IMSI) associated with a user device. The SMPP message being associated with modifying a universal integrated circuit card (UICC) of the user device. The device may determine, using the IMSI associated with the user device, a network device to which the user device is connected. The device may provide, to the network device, a short message service (SMS) message associated with modifying the UICC of the user device to permit the UICC of the user device to be modified.

20 Claims, 6 Drawing Sheets

SYSTEM AND METHOD FOR EFFICIENT SHORT MESSAGE SERVICE DELIVERY USING PRIVATE SUBSCRIBER IDENTITY INFORMATION

RELATED APPLICATION

This application is a continuation of U.S. patent application Ser. No. 15/702,330, filed Sep. 12, 2017, the disclosure of which is incorporated herein by reference.

BACKGROUND

Over-the-air (OTA) is a technology that permits a network operator to wirelessly introduce new subscriber identity module (SIM) services, modify content of universal integrated circuit cards (UICCs), download applications to UICCs, and/or the like.

A UICC is a smart card that can be used in mobile terminals in global system for mobile communications (GSM), long-term evolution (LTE) networks, fifth generation (5G) networks, universal mobile telecommunications system (UMTS) networks, and/or the like. The UICC contains several applications and makes it possible for the same smart card to permit access to multiple networks.

DETAILED DESCRIPTION OF PREFERRED EMBODIMENTS

The following detailed description of example implementations refers to the accompanying drawings. The same reference numbers in different drawings may identify the same or similar elements.

A network operator can deploy a SIM OTA platform to manage smart cards (e.g., UICCs, embedded UICCs (eUICCs), and/or the like). For example, a SIM OTA platform can be used to send SMS messages to user devices (e.g., smartphones, Internet-of-things (IoT) devices, and/or the like) to manage UICCs associated with the user devices, such as by activating UICCs, managing files associated with UICCs, installing applets on UICCs, and/or the like. While some implementations herein describe UICCs, it should be understood that implementations herein are applicable to other types of smart cards (e.g., eUICCs, SIM cards, and/or the like).

To manage a UICC associated with a user device, the SIM OTA platform can send a short message peer-to-peer (SMPP) message to a long term evolution (LTE) SMS gateway (LSGW). For example, the SIM OTA platform can encode a message (e.g., submit_sm) in SMPP format, and can include public subscriber identity information (e.g., a mobile station international subscriber directory number (MSISDN)) associated with the user device in a destination address field of the SMPP message.

The LSGW can receive the SMPP message and use the MSISDN to identify a particular network device to which the user device is connected for network access, such as a serving call session control function (S-CSCF) device. The LSGW can provide, to an Internet Protocol (IP) multimedia subsystem (IMS) subscriber data management (IMS SDM) system, a request for information associated with the particular S-CSCF to which the user device is connected. The LSGW can include, in the request, the MSISDN that was received from the SIM OTA platform.

In situations where the user device is provisioned with an MSISDN, the IMS SDM system can identify, using the MSISDN, the particular S-CSCF to which the user device is connected. Further, the IMS SDM system can provide, to the LSGW, information associated with the particular S-CSCF to which the user device is connected. The LSGW can then provide an SMS message to the particular S-CSCF to permit the user device to receive the SMS message. The user device can establish a data connection with the SIM OTA platform based on the information of the received SMS message, and can be configured through OTA after establishing the data connection.

In other cases, such as in situations where the user device does not include a valid MSISDN, the user device can connect to the IMS network using private subscriber identity information (e.g., an international mobile subscriber identity (IMSI)). Notwithstanding, the SIM OTA platform can provide, to the LSGW, an SMPP message that includes the MSISDN of the user device that is to be configured OTA.

The LSGW can provide, to the IMS SDM system and using the MSISDN received from the SIM OTA platform, a request for information associated with the particular S-CSCF to which the user device is connected. In this case, the IMS SDM system might determine that a user device, having the MSISDN, is not connected to the network because the user device connected to the IMS network using an IMSI instead of an MSISDN. In turn, the IMS SDM system can provide a response indicating that the user device is not connected to the IMS network, and can thus fail to provide information identifying the S-CSCF to which the user device is connected.

Based on the response, the LSGW can provide, to the IMS SDM system, another request for information associated with an IMSI that is associated with the MSISDN. The IMS SDM system can determine, based on stored information, an IMSI that is associated with the MSISDN, and provide a response that identifies the IMSI associated with the user device. The LSGW can provide, to the IMS SDM system and using the IMSI, another request for information associated with the S-CSCF to which the user device is connected. The IMS SDM system can identify the S-CSCF to which the user device is connected, and provide a response identifying the S-CSCF. The LSGW can then provide an SMS to the S-CSCF to permit the user device to receive the SMS and, in turn, be configured OTA by the SIM OTA platform.

In situations where a significant number (e.g., millions, billions, etc.) of user devices attach to the IMS network without using an MSISDN, the number of requests provided by the LSGW to the IMS SDM system, to identify an IMSI associated with an MSISDN, can consume significant network resources, can consume processor and/or memory resources of the ISM SDM system and LSGW, or the like.

In other cases, IoT devices might be configured without MSISDNs (e.g., MSISDN less). For example, deployment of a significant number of IoT devices (e.g., millions, billions, etc. of IoT devices) renders MSISDN provisioning impractical for IoT devices. Further, IoT devices may only require packet data service and may not require voice services, and thereby do not require MSISDN provisioning. As such, the LSGW might be required to perform similar requests as described above in order to identify IMSIs associated with the IoT devices to permit the LSGW to identify SGs interworking function devices (SGs-IWF) to which the IoT devices are connected. In this case, network resources can be consumed, and processor and/or memory resources of IoT SDM systems and LSGWs can be consumed based on the significant number of requests associated with identifying IMSIs that are associated with MSISDNs.

Some implementations described herein provide a SIM OTA platform that may provide, to an LSGW, an SMPP message that includes an IMSI associated with a user device. Additionally, some implementations described herein permit the LSGW to determine, using the IMSI associated with the user device, a network device (e.g., an S-CSCF, an SGs-IWF, and/or the like) to which the user device is connected. Additionally, some implementations described herein permit the LSGW to provide, to the network device, an SMS message that is to be delivered to the user device.

The user device (e.g., a UICC of the user device) may receive the SMS message, and may establish a data connection with the SIM OTA platform based on the information of the SMS message. In this way, the SIM OTA platform may perform UICC management functions OTA after establishing the data connection with the user device.

In this way, some implementations described herein reduce a number of requests, provided by LSGWs to SDM systems, associated with identifying IMSIs of user devices. In practice, some implementations described herein may obviate the need for millions, billions, trillions, etc. of requests associated with identifying IMSIs of user devices. In this way, some implementations described herein conserve network resources, conserve processor and/or memory resources of LSGWs, and/or conserve processor and/or memory resources of SDM systems.

Figure 1:
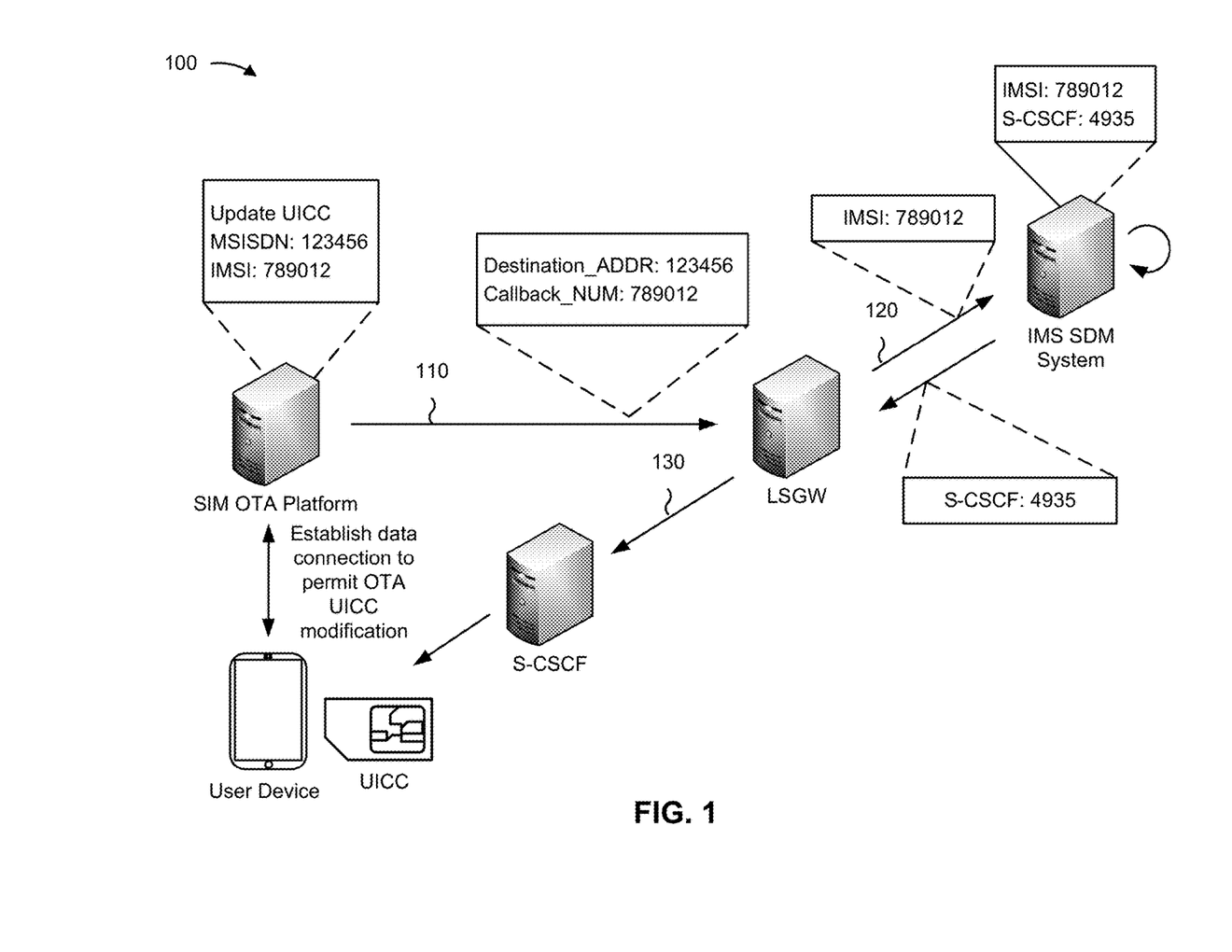
FIG. 1 is a diagram of an overview of an example implementation described herein.

FIG. 1 is a diagram of an overview of an example implementation 100 described herein. As shown in FIG. 1, example implementation 100 may include a SIM OTA platform, an LSGW, an IMS SDM system, an S-CSCF, and a user device with a UICC. As shown by reference number 110, the SIM OTA platform may provide, to the LSGW, an SMPP message that includes an IMSI associated with a user device that is to be configured OTA by the SIM OTA platform. For example, the user device may be associated with an MSISDN (shown as 123456) and may be associated with an IMSI (shown as 789012). As an example, the SMPP message (e.g., a submit_sm message) may include the MSISDN in a destination address field (e.g., shown as Destination_ADDR) and the IMSI in a callback number field (e.g., shown as Callback_NUM).

As shown by reference number 120, the LSGW may provide, to the IMS SDM system, a request for information associated with the S-CSCF to which the user device is connected based on receiving the SMPP message. For example, the LSGW may provide a request that includes the IMSI associated with the user device. In this case, the IMS SDM system may determine, using the IMSI, the particular S-CSCF to which the user device is connected. Additionally, the IMS SDM system may provide a response that includes information (e.g., a device identifier, a network address, and/or the like) associated with the S-CSCF (shown as 4935).

Currently, there is no standard parameter to carry the private subscriber identity (e.g., IMSI) in SMPP. By including the IMSI in the SMPP message, some implementations described herein obviate the need for additional private subscriber identify requests, provided by the LSGW to the IMS SDM system, for an IMSI that is associated with an MSISDN number (e.g., in the event that the user device is not configured with an MSISDN, includes an invalid MSISDN, does not connect to a network using an MSISDN, and/or the like). By using the IMSI when requesting the information associated with the S-CSCF, the LSGW may reduce the number of additional private subscriber identity requests provided to the IMS SDM system. In practice, some implementations described herein may obviate the need for millions, billions, trillions, etc. of requests from being provided to SDM systems, thereby conserving processor and/or memory resources of LSGWs and/or SDM systems, and/or conserving network resources.

As shown by reference number 130, the LSGW may provide, to the S-CSCF identified based on the information received from the IMS SDM system, an SMS message that is associated with UICC management operations. For example, the SMS message may instruct a UICC of the user device to establish a data connection with the SIM OTA platform to permit the SIM OTA platform to perform OTA UICC configuration.

While an IMS network is shown in example FIG. 1, it should be understood that some implementations described herein are applicable to IoT networks and/or other types of networks. Additionally, while an S-CSCF is shown in FIG. 1, it should be understood that an IoT implementation may include an SGs-IWF.

Some implementations described herein reduce a number of additional subscriber identity requests, provided by LSGWs to SDM systems, associated with identifying IMSIs of user devices. In practice, some implementations described herein may obviate the need for millions, billions, trillions, etc. of requests associated with identifying IMSIs of user devices. In this way, some implementations described herein conserve network resources, conserve processor and/or memory resources of LSGWs, and/or conserve processor and/or memory resources of SDM systems.

As indicated above, FIG. 1 is provided merely as an example. Other examples are possible and may differ from what was described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of FIG. 1 may perform one or more functions described as being performed by another set of devices of FIG. 1.

Figure 2:
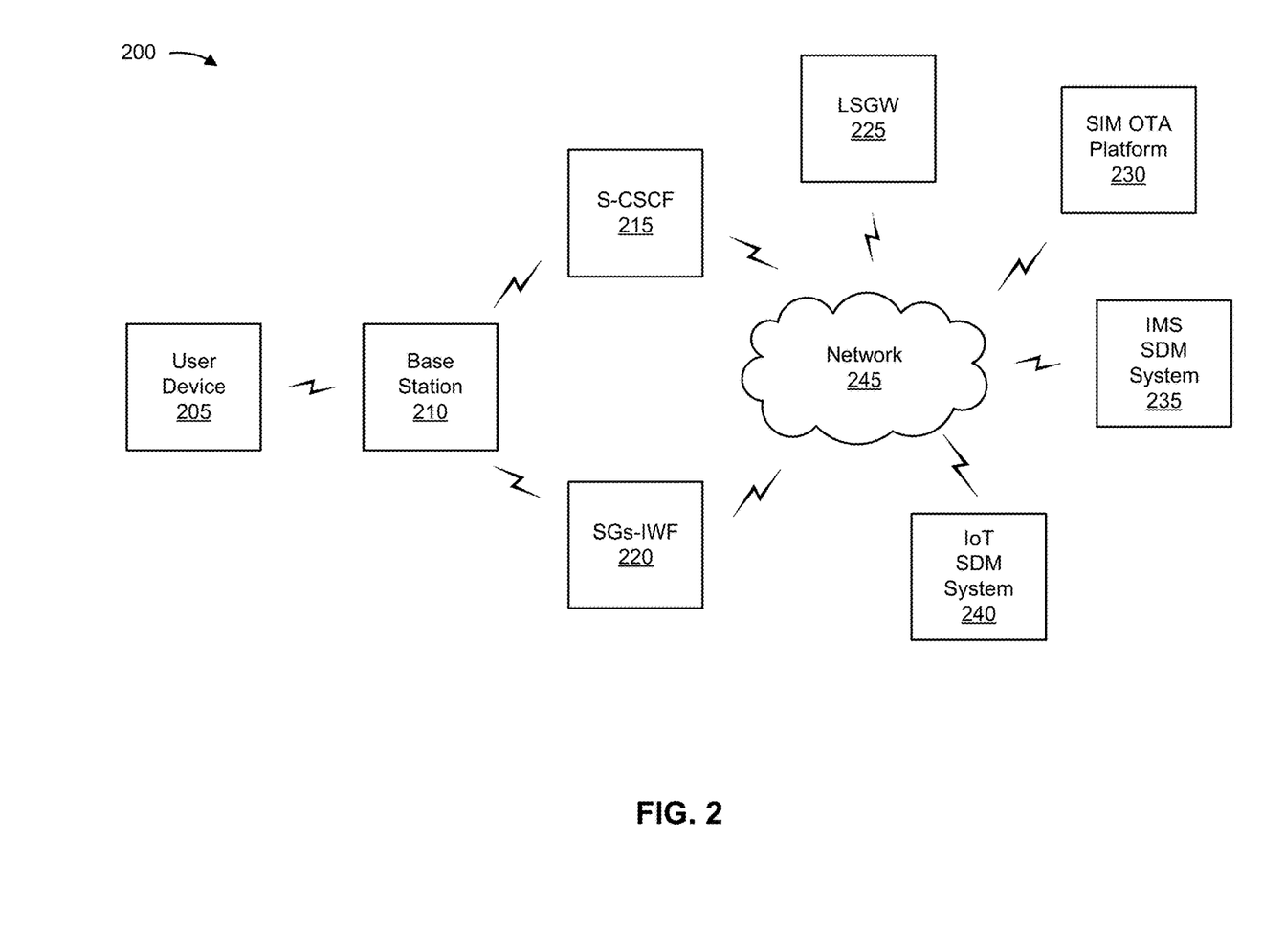
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, an S-CSCF 215, an SGs-IWF 220, an LSGW 225, a SIM OTA platform 230, an IMS SDM system 235, an IoT SDM system 240, and/or a network 245. Devices of environment 200 may interconnect via wired connections, wireless connections, optical connections, or a combination of connections.

User device 205 includes one or more devices capable of communicating with base station 210 and/or a network (e.g., network 245). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. In some implementations, user device 205 includes one or more machine-to-machine (M2M) devices and/or one or more IoT devices (e.g., any "thing" in the IoT). User device 205 may send network traffic to and/or receive network traffic from network 245 (e.g., via base station 210).

In some implementations, user device 205 includes a UICC and is capable of being associated with a set of identifiers, such as an MSISDN, a mobile directory number (MDN), an IMSI, an international mobile equipment identifier (IMEI), and/or the like. In some implementations, user device 205 (e.g., a UICC of user device 205) is capable of being configured OTA via SIM OTA platform 230.

Base station 210 includes one or more devices capable of transferring network traffic, such as audio, video, text, and/or other network traffic, destined for and/or received from user device 205. In some implementations, base station 210 may include an evolved Node B (eNB) associated with the LTE network that receives network traffic from and/or sends network traffic to network 245 via a serving gateway (SGW) and/or a packet data network gateway (PGW). Additionally, or alternatively, one or more base stations 210 may be associated with a radio access network (RAN) that is not associated with the LTE network. Base station 210 may send network traffic to and/or receive network traffic from user device 205 via an air interface. In some implementations, base station 210 may include a small cell base station, such as a base station of a microcell, a picocell, and/or a femtocell.

S-CSCF 215 includes one or more devices capable of receiving, storing, processing, controlling, and/or providing information associated with SMS messages destined for user devices 205 associated with an IMS network. For example, S-CSCF 215 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers network traffic.

SGs-IWF 220 includes one or more devices capable of receiving, storing, processing, controlling, and/or providing information associated with SMS messages destined for user devices 205 associated with an IoT network. For example, SGs-IWF 220 may include one or more data processing and/or traffic transfer devices, such as a gateway, a router, a modem, a switch, a firewall, a NIC, a hub, a bridge, a server device, an OADM, or any other type of device that processes and/or transfers network traffic.

LSGW 225 includes one or more devices capable of receiving, storing, processing, controlling, and/or providing information associated with an SMS message. For example, LSGW 225 may include one or more data processing and/or traffic transfer devices, such as a gateway, a router, a modem, a switch, a firewall, a NIC, a hub, a bridge, a server device, an OADM, or any other type of device that processes and/or transfers network traffic.

SIM OTA platform 230 includes one includes one or more devices capable of receiving, storing, processing, controlling, and/or providing information associated with OTA UICC modification and management. For example, SIM OTA platform 230 may include a server device, a cloud computing device, or a similar device.

IMS SDM system 235 includes one or more devices, such as one or more server devices, capable of managing (e.g., receiving, generating, storing, processing, and/or providing) information associated with user devices 205 associated with an IMS core network. For example, IMS SDM system 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. IMS SDM system 235 may provide this information to one or more other devices of environment 200 to support the operations performed by those devices.

IoT SDM system 240 includes one or more devices, such as one or more server devices, capable of managing (e.g., receiving, generating, storing, processing, and/or providing) information associated with user devices 205 associated with an IoT network. For example, IoT SDM system 240 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of data consumption allowed per time period, etc.), and/or similar information. IoT SDM system 240 may provide this information to one or more other devices of environment 200 to support the operations performed by those devices.

Network 245 includes one or more wired and/or wireless networks. For example, network 245 may include a cellular network (e.g., a fifth generation (5G) network, an LTE network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
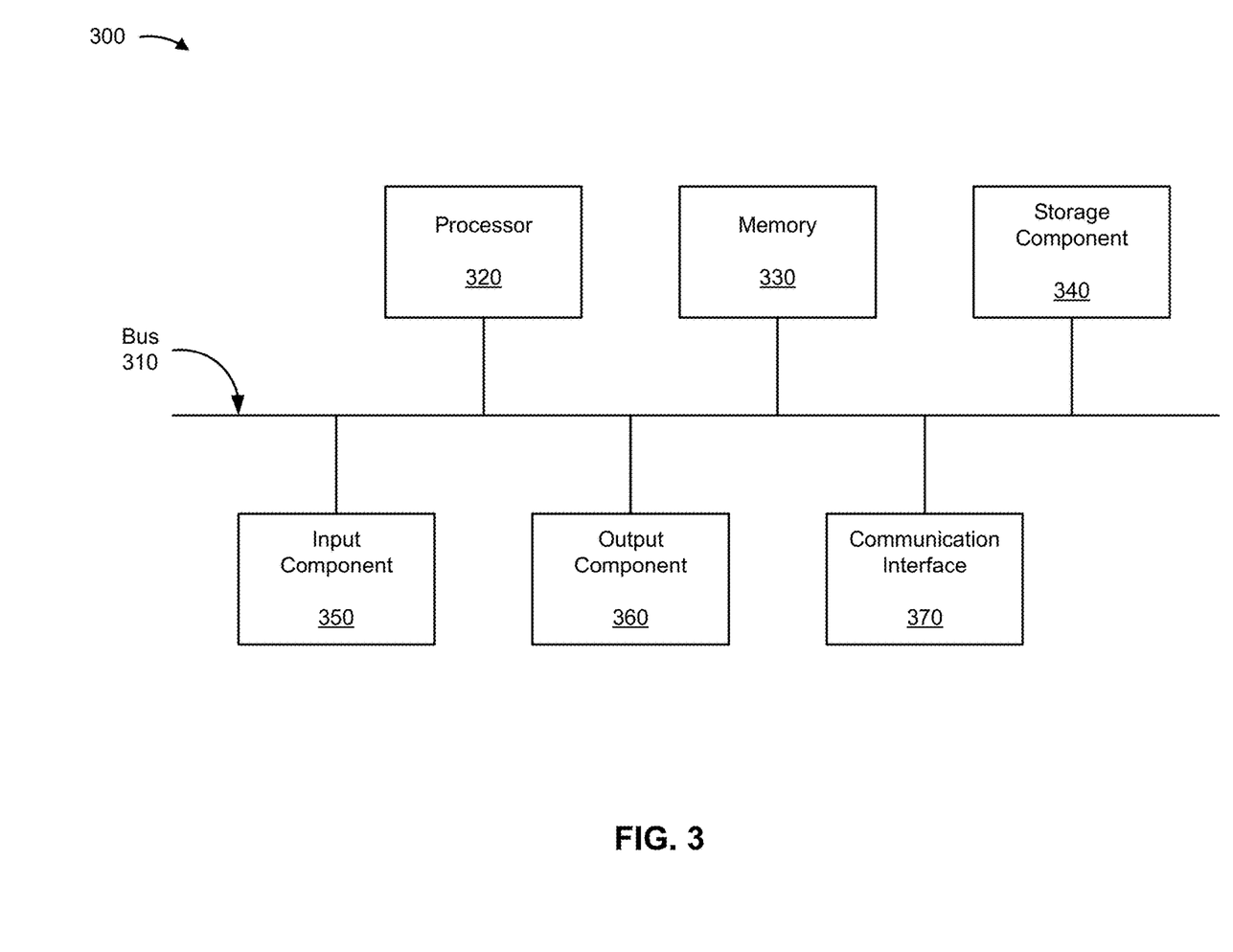
FIG. 3 is a diagram of example components of one or more devices of FIG. 2.

FIG. 3 is a diagram of example components of a device 300. Device 300 may correspond to user device 205, base station 210, S-CSCF 215, SGs-IWF 220, LSGW 225, SIM OTA platform 230, IMS SDM system 235, and/or IoT SDM system 240. In some implementations, user device 205, base station 210, S-CSCF 215, SGs-IWF 220, LSGW 225, SIM OTA platform 230, IMS SDM system 235, and/or IoT SDM system 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
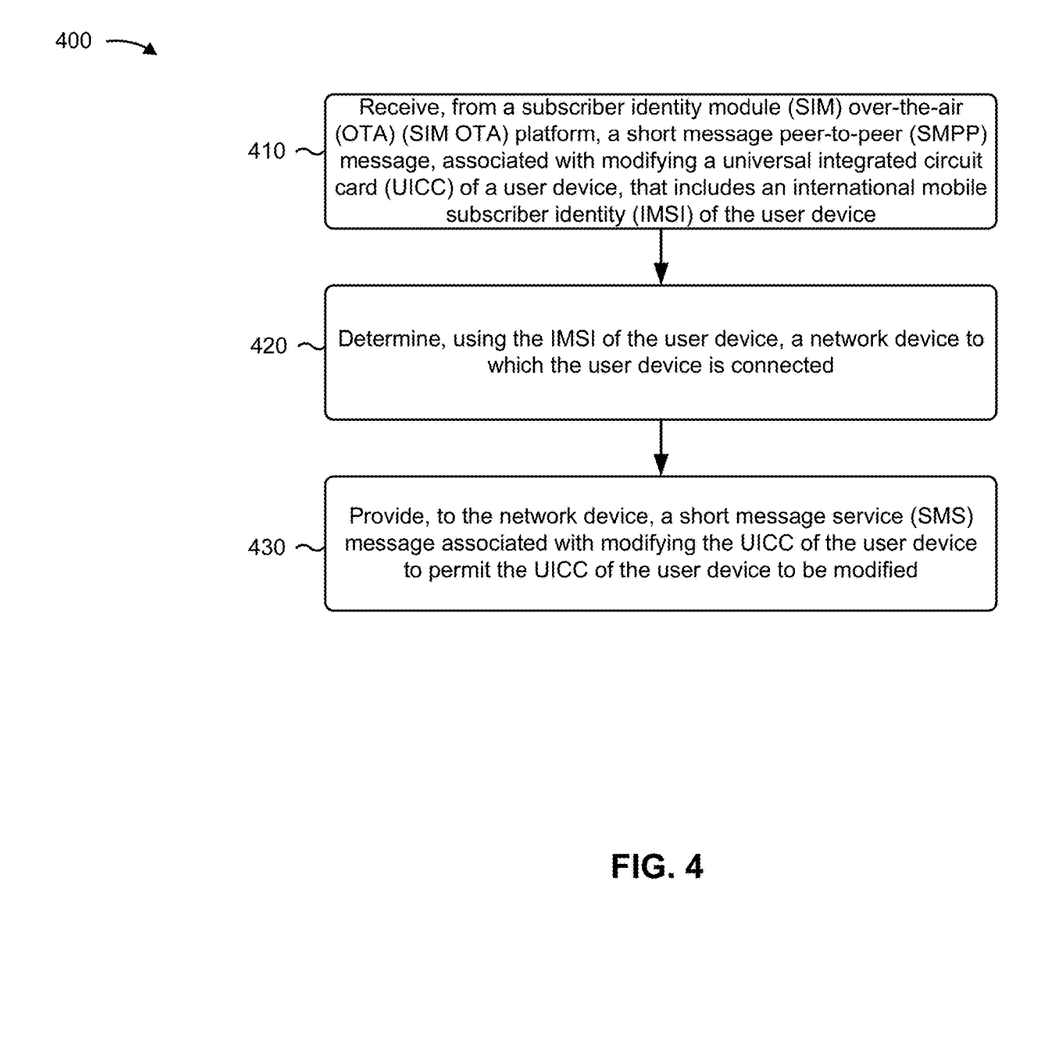
FIG. 4 is a flow chart of an example process for using private subscriber identity information for efficient short message service (SMS) delivery.

FIG. 4 is a flow chart of an example process 400 for using private subscriber identity information instead of public subscriber identity information for efficient short message service (SMS) delivery. In some implementations, one or more process blocks of FIG. 4 may be performed by LSGW 225. In some implementations, one or more process blocks of FIG. 4 may be performed by another device or a group of devices separate from or including LSGW 225, such as S-CSCF 215, SGs-IWF 220, SIM OTA platform 230, IMS SDM system 235, and/or IoT SDM system 240.

As shown in FIG. 4, process 400 may include receiving, from a subscriber identity module (SIM) over-the-air (OTA) (SIM OTA) platform, a short message peer-to-peer (SMPP) message, associated with modifying a universal integrated circuit card (UICC) of a user device, that includes an international mobile subscriber identity (IMSI) of the user device (block 410). For example, LSGW 225 may receive, from SIM OTA platform 230, an SMPP message that includes an IMSI of a user device 205 to which an SMS message associated with UICC OTA management is to be provided.

In some implementations, SIM OTA platform 230 may provide, to LSGW 225, the SMPP message to cause LSGW 225 to send an SMS message to user device 205. For example, the SMS message may be associated with a UICC management operation. In some implementations, the SMS message may include an instruction for user device 205 to establish a data connection with SIM OTA platform 230 to permit SIM OTA platform 230 to perform UICC management operations in association with a UICC of user device 205 (e.g., modify a device identifier, modify a public land mobile network (PLMN) setting, install an applet, and/or the like). It should be understood that various other operations, in addition to operations described above, are possible.

In some implementations, SIM OTA platform 230 may provide, to LSGW 225, an SMPP message based on a time frame (e.g., periodically), based on an event, based on an instruction from another device, based on a configuration, based on receiving a set of configuration files from a network operator system, and/or the like.

In some implementations, SIM OTA platform 230 may provide an SMPP message that includes a set of parameters associated with a set of fields of the SMPP message. As used herein, a message may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

For example, SIM OTA platform 230 may provide a submit_sm message that includes, among other fields, a destination_addr field and a set of optional parameter fields. It should be understood that multiple other fields are included in the submit_sm message. In some implementations, the destination_addr field may include a public identity identifier of user device 205 to which the SMS is to be sent. For example, the destination_addr field may include an MSISDN of user device 205. In some implementations, an optional parameter field may include a private identity identifier of user device 205. For example, an optional parameter field may include an IMSI of user device 205. In some implementations, the optional parameter field may be a callback_num field. It should be understood that other implementations include other fields having different information.

In this way, the SMPP message may include a public identify identifier of user device 205 (e.g., an MSISDN), and may include a private identity identifier of user device 205 (e.g., an IMSI). Thereby, as described elsewhere herein, some implementations described herein reduce a number of requests, provided by LSGW 225, associated with identifying IMSIs of user devices 205 (e.g., because the IMSI is included in the SMPP message).

In this way, LSGW 225 may receive, from SIM OTA platform 230, the SMPP message that includes the IMSI of user device 205 to which the SMS message, associated with UICC management, is to be provided. Additionally, in this way, LSGW 225 may determine, using the IMSI, a network device to which user device 205 is connected, as described below.

As further shown in FIG. 4, process 400 may include determining, using the IMSI of the user device, a network device to which the user device is connected (block 420). For example, LSGW 225 may provide, to IMS SDM system 235 or IoT SDM system 240, a request for information associated with S-CSCF 215 or SGs-IWF 220 (e.g., respectively) to which user device 205 is connected based on receiving the SMPP message that includes the IMSI of user device 205.

In some implementations, LSGW 225 may identify a type of user device 205 based on the SMPP message. For example, LSGW 225 may identify whether user device 205 is a smartphone, an IoT device, and/or the like, based on values associated with particular fields of the SMPP message. As an example, a first value may indicate that the user device 205 is a UE, a table computer, and/or the like. Continuing the example, a second value may indicate that user device 205 is an IoT device.

In some implementations, LSGW 225 may provide, to an SDM system, a request for information associated with a particular network device to which user device 205 is connected. For example, in the case of user device 205 being a smart phone, LSGW 225 may provide, to IMS SDM system 235, a request for information associated with the particular S-CSCF 215 to which user device 205 is connected. Additionally, or alternatively, in the case of user device 205 being an IoT device, LSGW 225 may provide, to IoT SDM system 240, a request for information associated with the particular SGs-IWF 220 to which user device 205 is connected.

In some implementations, LSGW 225 may provide, to IMS SDM system 235 and using the MSISDN of user device 205, a request for information associated with the particular S-CSCF 215 to which user device 205 is connected. Additionally, or alternatively, IMS SDM system 235 may identify, based on the MSISDN of user device 205, the particular S-CSCF 215 to which user device 205 is connected. Additionally, or alternatively, IMS SDM system 235 may provide, to LSGW 225, information associated with the particular S-CSCF 215. For example, IMS SDM system 235 may provide information that permits LSGW 225 to provide, to S-CSCF 215, an SMS message. As examples, IMS SDM system 235 may provide information associated with a device identifier of S-CSCF 215, a network address of S-CSCF 215, and/or the like.

In some implementations, IMS SDM system 235 may not identify, based on the MSISDN of user device 205, the particular S-CSCF 215 to which user device 205 is connected. For example, user device 205 may not include an MSISDN, may include an invalid MSISDN, may not connect to the IMS network using an MSISDN, and/or the like. In this case, LSGW 225 may provide another request to IMS SDM system 235 using the IMSI of user device 205. Additionally, or alternatively, IMS SDM system 235 may provide, to LSGW 225, a response that includes information associated with S-CSCF 215 to which user device 205 is connected. In this way, LSGW 225 may determine, using the IMSI, the S-CSCF 215 to which user device 205 is connected without providing, to IMS SDM system 235, a request for information associated with the IMSI associated with the MSISDN of user device 205. Thereby, some implementations described herein conserve computing and network resources by reducing a number of requests, provided by LSGW 225 to IMS SDM system 235, associated with identifying IMSIs of user devices 205.

In some implementations, LSGW 225 may provide, to IMS SDM system 235 and using the IMSI of user device 205, a request for information associated with the particular S-CSCF 215 to which user device 205 is connected. Additionally, LSGW 225 may provide the request without having provided a prior request using the MSISDN of user device 205. In this way, some implementations described herein may conserve computing and network resources by reducing a number of requests provided by LSGW 225 to S-CSCF 215.

In some implementations, LSGW 225 may provide, to IoT SDM system 240 and using the IMSI of user device 205, a request for information associated with the particular SGs-IWF 220 to which user device 205 is connected. For example, LSGW 225 may provide the request to IoT SDM system 240 in situations where user device 205 is an IoT device.

In some implementations, IoT SDM system 240 may provide, to LSGW 225, a response that includes information associated with SGs-IWF 220 to which user device 205 is connected. In this way, LSGW 225 may determine, using the IMSI, the SGs-IWF 220 to which user device 205 is connected without requesting IoT SDM system 240 for the IMSI associated with user device 205. Thereby, some implementations described herein conserve computing and network resources by reducing a number of requests, provided by LSGW 225 to IoT SDM system 240, for information associated with IMSIs of user devices 205 (e.g., because the IMSI is included in the SMPP message received from SIM OTA platform 230).

In this way, LSGW 225 may receive information that permits LSGW 225 to provide an SMS message to the particular network device to which user device 205 is connected, as described below.

As further shown in FIG. 4, process 400 may include providing, to the network device, a short message service (SMS) message associated with modifying the UICC of the user device to permit the UICC of the user device to be modified (block 430). For example, LSGW 225 may provide, to S-CSCF 215 or SGs-IWF 220, an SMS message that is associated with UICC management operations. In some implementations, the SMS message may instruct a UICC of user device 205 to cause user device 205 to establish a data connection with SIM OTA platform 230. Based on the data connection, SIM OTA platform 230 may perform UICC management operations in association with the UICC of user device 205.

Some implementations described herein may obviate the need for millions, billions, trillions, etc. of requests associated with identifying IMSIs of user devices 205. In this way, some implementations described herein conserve network resources, conserve processor and/or memory resources of LSGWs 225, and/or conserve processor and/or memory resources of SDM systems.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
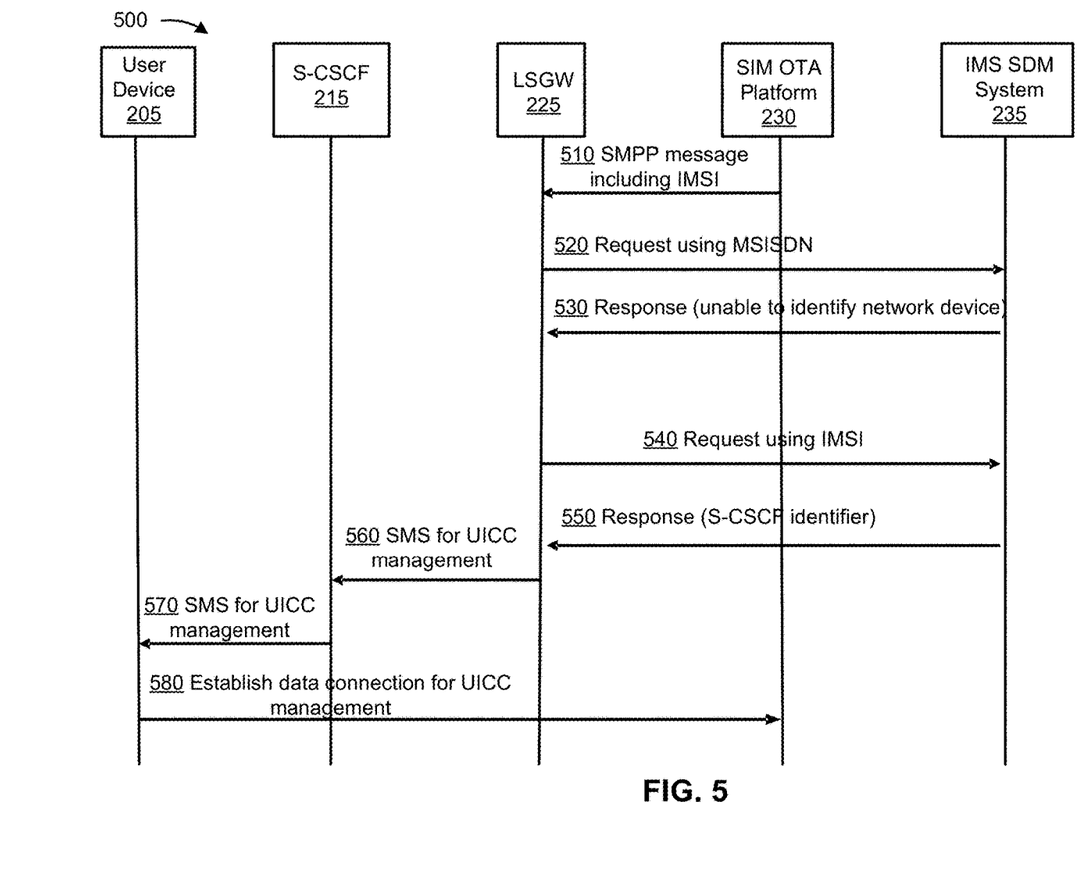
FIG. 5 is a diagram of a call flow of example operations capable of being performed by one or more devices of FIG. 2.

FIG. 5 is a diagram of a call flow of example operations capable of being performed by one or more devices of FIG. 2. For example, FIG. 5 is a call flow diagram of an example call flow 500 for using private subscriber identity information instead of public subscriber identity information for efficient short message service (SMS) delivery in an IMS network.

As shown in FIG. 5, and by reference number 510, SIM OTA platform 230 may send, to LSGW 225, an SMPP message that includes an IMSI of a user device 205 to which an SMS message is to be provided. As shown by reference number 520, LSGW 225 may provide, to IMS SDM system 235 and using the MSISDN of user device 205, a request for information associated with the particular S-CSCF 215 to which user device 205 is connected. As shown by reference number 530, in situations where IMS SDM system 235 does not identify the particular S-CSCF 215 based on the MSISDN, IMS SDM system 235 may send a response to LSGW 225 indicating that IMS SDM system 235 does not identify the particular S-CSCF 215.

In this case, as shown by reference number 540, LSGW 225 may provide a request to IMS SDM system 235 using the IMSI of user device 205. As shown by reference number 550, IMS SDM system 235 may provide, to LSGW 225, a response that includes information associated with S-CSCF 215 to which user device 205 is connected. As shown by reference number 560, LSGW 225 may provide, to S-CSCF 215, an SMS message associated with UICC management operations. As shown by reference number 570, S-CSCF 215 may send the SMS message to user device 205. As shown by reference number 580, user device 205 may establish a data connection with SIM OTA platform 230 to permit SIM OTA platform 230 to modify the UICC of user device 205.

In this way, LSGW 225 may provide, to S-CSCF 215, the SMS for UICC management operations without having provided, to IMS SDM system 235, a request for the IMSI associated with user device 205.

Additionally, while a first request using the MSISDN is shown, it should be understood that LSGW 225 may provide a single request, using the IMSI of user device 205, instead of two separate requests.

As indicated above, FIG. 5 is provided merely as an example. Other examples are possible and may differ from what was described with regard to FIG. 5. While a particular series of operations and/or data flows have been described above with regard to FIG. 5, the order of the operations and/or data flows may be modified in other implementations. Further, non-dependent operations may be performed in parallel.

Figure 6:
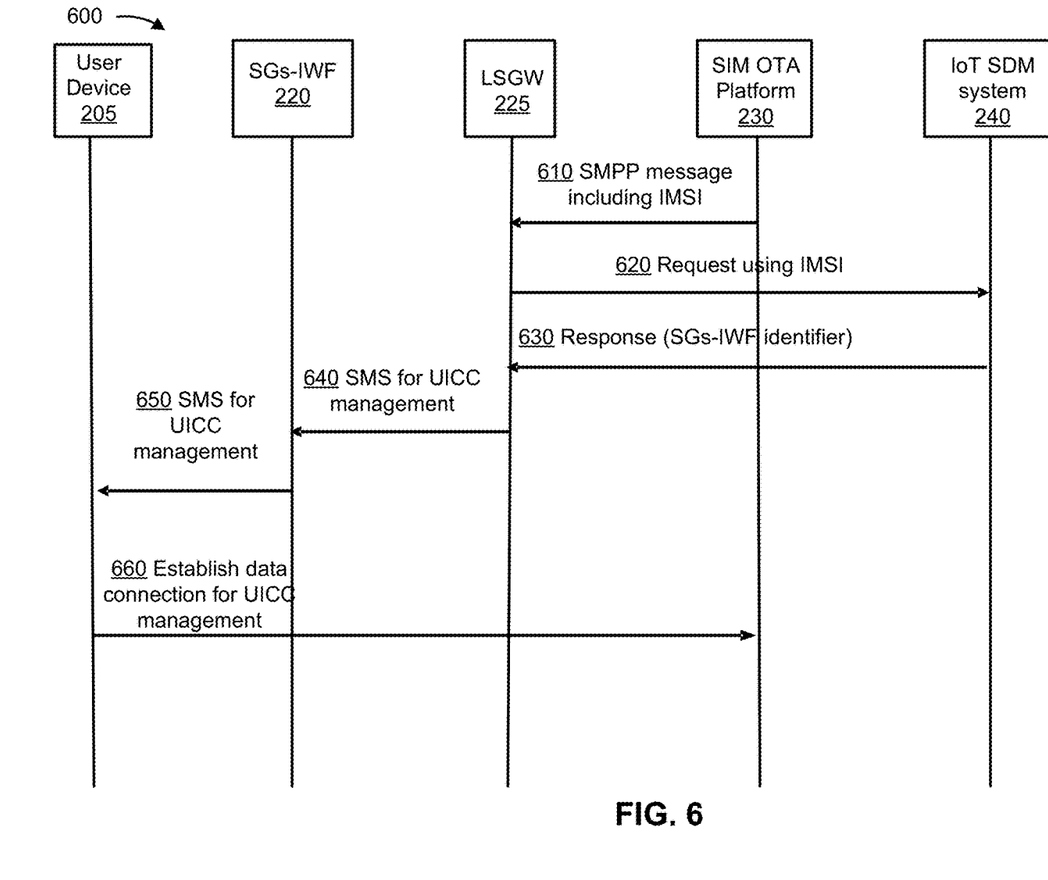
FIG. 6 is another diagram of a call flow of example operations capable of being performed by one or more devices of FIG. 2.

FIG. 6 is a diagram of a call flow of example operations capable of being performed by one or more devices of FIG. 2. For example, FIG. 6 is a call flow diagram of an example call flow 600 for using private subscriber identity information instead of public subscriber identity information for efficient short message service (SMS) delivery in an IoT network.

As shown in FIG. 6, and by reference number 610, SIM OTA platform 230 may send, to LSGW 225, an SMPP message that includes an IMSI of a user device 205 to which an SMS message is to be provided. As shown by reference number 620, LSGW 225 may provide, to IoT SDM system 240 and using the IMSI of user device 205, a request for information associated with the particular SGs-IWF 220 to which user device 205 is connected.

As shown by reference number 630, IoT SDM system 240 may provide, to LSGW 225, a response that includes information associated with SGs-IWF 220 to which user device 205 is connected. As shown by reference number 640, LSGW 225 may provide, to SGs-IWF 220, an SMS message associated with UICC management operations. As shown by reference number 650, SGs-IWF 220 may send the SMS message to user device 205 to permit SIM OTA platform 230 to modify the UICC of user device 205. As shown by reference number 660, user device 205 may establish a data connection with SIM OTA platform 230 to permit SIM OTA platform 230 to modify the UICC of user device 205.

In this way, LSGW 225 may provide, to SGs-IWF 220, the SMS for UICC management without having provided, to IoT SDM system 240, a request for the IMSI of user device 205.

As indicated above, FIG. 6 is provided merely as an example. Other examples are possible and may differ from what was described with regard to FIG. 6. While a particular series of operations and/or data flows have been described above with regard to FIG. 6, the order of the operations and/or data flows may be modified in other implementations. Further, non-dependent operations may be performed in parallel.

Some implementations described herein provide a SIM OTA platform that may provide, to an LSGW, an SMPP message that includes an IMSI associated with a user device. Additionally, some implementations described herein permit the LSGW to determine, using the IMSI associated with the user device, a network device (e.g., an S-CSCF, an SGs-IWF, and/or the like) to which the user device is connected. Additionally, some implementations described herein permit the LSGW to provide, to the network device, an SMS message that is to be delivered to the user device. The user device (e.g., a UICC of the user device) may receive the SMS message, and establish, based on the SMS message, a data connection with the SIM OTA platform. In this way, the SIM OTA platform may perform UICC management functions OTA.

In this way, some implementations described herein reduce a number of requests, provided by the LSGW to SDM systems, associated with identifying IMSIs of user devices. In practice, some implementations described herein may obviate the need for millions, billions, trillions, etc. of requests associated with identifying IMSIs of user devices. In this way, some implementations described herein conserve network resources, conserve processor and/or memory resources of LSGWs, and/or conserve processor and/or memory resources of SDM systems.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors, communicatively coupled to the memory, to:
receive a response from a subscriber data management (SDM) system,
the response indicating that the SDM system is unable to identify a network device using a mobile station international subscriber directory number (MSISDN) of a user device;
determine, using an international mobile subscriber identity (IMSI) and without using the MSISDN, the network device to which the user device is connected;
receive information associated with the network device; and
provide, to the network device and based on receiving the information, a short message service (SMS) message associated with modifying a universal integrated circuit card (UICC) of the user device.

2. The device of claim 1, where the one or more processors, when providing the SMS message, are to:
provide the SMS message to the network device,
the network device to transmit the SMS message to the user device.

3. The device of claim 1, where the one or more processors, when receiving the information associated with the network device, are to:
receive information associated with a particular serving call session control function (S-CSCF) device or a particular SGs interworking function (SGs-IWF) device to which the user device is connected.

4. The device of claim 1, where the one or more processors are further to:
receive a short message peer-to-peer (SMPP) message,
the SMPP message including the IMSI associated with the user device.

5. The device of claim 1, where the one or more processors are further to:
transmit a request for the information associated with the network device to the SDM system; and
where the one or more processors, when receiving the information associated with the network device, are to:
receive the information associated with the network device from the SDM system.

6. The device of claim 1, where the user device establishes a data connection with a subscriber identity module (SIM) over-the-air (OTA) platform to modify the UICC of the user device.

7. A non-transitory computer-readable medium storing instructions, the instructions comprising:
one or more instructions that, when executed by one or more processors, cause the one or more processors to:
receive a response from a subscriber data management (SDM) system,
the response indicating that the SDM system is unable to identify a network device using a mobile station international subscriber directory number (MSISDN) of a user device;
determine, using an international mobile subscriber identity (IMSI) and without using the MSISDN, the network device to which the user device is connected;
receive information associated with the network device; and provide, to the network device and based on receiving the information, a short message service (SMS) message associated with modifying a universal integrated circuit card (UICC) of the user device.

8. The non-transitory computer-readable medium of claim 7, where the one or more instructions, that cause the one or more processors to provide the SMS message, cause the one or more processors to:
provide the SMS message to the network device,
the network device to transmit the SMS message to the user device.

9. The non-transitory computer-readable medium of claim 7, where the one or more instructions, that cause the one or more processors to receive the information associated with the network device, cause the one or more processors to:
receive information associated with a particular serving call session control function (S-CSCF) device or a particular SGs interworking function (SGs-IWF) device to which the user device is connected.

10. The non-transitory computer-readable medium of claim 7, where the one or more instructions, when executed by the one or more processors, further cause the one or more processors to:
receive a short message peer-to-peer (SMPP) message, the SMPP message including the IMSI associated with the user device.

11. The non-transitory computer-readable medium of claim 7, where the one or more instructions, when executed by the one or more processors, further cause the one or more processors to:
transmit a request for the information associated with the network device to the SDM system; and
where the one or more instructions, that cause the one or more processors to receive the information associated the network device, cause the one or more processors to:
receive the information associated with the network device from the SDM system.

12. The non-transitory computer-readable medium of claim 7, where the user device establishes a data connection with a subscriber identity module (SIM) over-the-air (OTA) platform to modify the UICC of the user device.

13. A method, comprising:
receiving, by a device, a response from a subscriber data management (SDM) system,
the response indicating that the SDM system is unable to identify a network device using a mobile station international subscriber directory number (MSISDN) of a user device;
determining, by the device, using an international mobile subscriber identity (IMSI) and without using the MSISDN, the network device to which the user device is connected;

receiving, by the device, information associated with the network device; and
providing, by the device and to the network device and based on receiving the information, a short message service (SMS) message associated with modifying a universal integrated circuit card (UICC) of the user device.

14. The method of claim 13, where providing the SMS message comprises:
providing the SMS message to the network device,
the network device to transmit the SMS message to the user device.

15. The method of claim 13, further comprising:
receiving a short message peer-to-peer (SMPP) message, the SMPP message including the IMSI associated with the user device.

16. The method of claim 13, further comprising:
transmitting a request for the information associated with the network device to the SDM system; and
where receiving the information associated the network device comprises:
receiving the information associated with the network device from the SDM system.

17. The method of claim 13, where the user device establishes a data connection with a subscriber identity module (SIM) over-the-air (OTA) platform to modify the UICC of the user device.

18. The device of claim 1, where the one or more processors, when providing the SMS message associated with modifying the UICC of the user device, are to:
provide the SMS message to modify at least one of:
a device identifier of the user device,
a public land mobile network (PLMN) setting of the user device, or
the user device by installing an applet.

19. The non-transitory computer-readable medium of claim 7, where the one or more instructions, that cause the one or more processors to provide the SMS message associated with modifying the UICC of the user device, cause the one or more processors to:
provide the SMS message to modify at least one of:
a device identifier of the user device,
a public land mobile network (PLMN) setting of the user device, or
the user device by installing an applet.

20. The method of claim 13, where providing the SMS message associated with modifying the UICC of the user device, comprises:
providing the SMS message to modify at least one of:
a device identifier of the user device,
a public land mobile network (PLMN) setting of the user device, or
the user device by installing an applet.

* * * * *